United States Patent [19]

Isgur et al.

[11] 4,182,649
[45] * Jan. 8, 1980

[54] POLYURETHANE FOAM SHEET AND METHOD

[75] Inventors: Irving E. Isgur, Framingham; Andrew B. Holmstrem, Burlington; Norman J. Hayes, Bedford, all of Mass.

[73] Assignee: W. R. Grace & Co., Cambridge, Mass.

[*] Notice: The portion of the term of this patent subsequent to Aug. 29, 1995, has been disclaimed.

[21] Appl. No.: 767,994

[22] Filed: Feb. 11, 1977

Related U.S. Application Data

[63] Continuation-in-part of Ser. No. 656,674, Feb. 9, 1976, Pat. No. 4,110,508.

[51] Int. Cl.² .............................................. D21D 3/00
[52] U.S. Cl. .................................... 162/101; 162/108; 162/155; 162/168 N; 162/169; 162/183; 428/237; 428/240; 428/248; 428/264; 428/271; 428/311; 428/317; 428/318; 428/327; 428/402; 428/423; 428/425
[58] Field of Search ............... 162/183, 101, 168 N, 162/169, 108, 145, 155; 428/264, 271, 286, 371, 314, 425, 240, 95, 306, 311, 327, 315, 402, 423, 323, 904, 237, 248, 318, 317; 427/180; 260/2.5 AK

[56] References Cited

U.S. PATENT DOCUMENTS

| 2,887,431 | 5/1959 | Piersol | 162/169 |
| 3,149,022 | 9/1964 | Griswold | 162/169 |
| 3,674,621 | 7/1972 | Miyamoto et al. | 162/157 |
| 3,694,301 | 9/1972 | Gruenewald et al. | 428/292 |

FOREIGN PATENT DOCUMENTS 1284090 11/1968 Fed. Rep. of Germany.
47-24263 5/1972 Japan .................................. 162/101

Primary Examiner—S. Leon Bashore
Assistant Examiner—Peter Chin
Attorney, Agent, or Firm—Lowell H. McCarter; C. Edward Parker

[57] ABSTRACT

Disclosed herein is a composite, self-supporting, polyurethane foam sheet prepared by forming an aqueous dispersion of hydrophilic polyurethane foam particles with fibers to serve as a binder therefor, wet-layering the dispersion onto a supporting screen to form a sheet, and removing water from the sheet. If desired, a porous web, woven or non-woven, e.g. paper, cloth, etc., can be positioned on the screen with the dispersion being layered out onto the web to form a laminar composite structure. Whether in sheet form or as a laminar structure the product of the invention is formed rapidly and possesses a desirable soft or cushioning feel.

35 Claims, No Drawings

POLYURETHANE FOAM SHEET AND METHOD

This application is a continuation-in-part of Ser. No. 656,674 filed Feb. 9, 1976 and entitled, "Foam Sheet and Method", now U.S. Pat. No. 4,110,508.

BACKGROUND OF THE INVENTION

Numerous attempts have been made to rapidly form foam materials into sheets which are homogeneous while possessing structural strength and also retaining the cushioning effect of the foam. For example, "one-shot" procedures for rapidly building up a sheet of polyurethane foam using spray techniques are well known. For many applications it is desirable to incorporate fibers into the polymer mixture.

In U.S. Pat. No. 4,110,508 referred to above a procedure for incorporating fibers is described. In this application hydrophilic polyurethane prepolymer is foamed and the resulting foam is shredded. Subsequently the shredded foam is dispersed in combination with fibers (e.g. asbestos or wood pulp) into water and the resulting aqueous dispersion is wet-layered onto a support which can be a screen or fabric web.

The present invention is an alternate and superior method for preparing the sheets and sheet/fabric laminates described in U.S. Pat. No. 4,110,508, said application being expressly incorporated by reference into the present application to the extent U.S. Pat. No. 4,110,508 describes the urethane prepolymer employed, the method of foaming and shredding the foam to produce hydrophilic particles, the preparation of sheets and laminates and describes these products and their utilities.

The present invention is an improvement over the invention of U.S. Pat. No. 4,110,508 in that the separate steps of foaming and shredding the resulting foam are avoided. By use of the present invention a hydrophilic urethane prepolymer is dispersed in water and foamed simultaneously which results in a simplified process as well as a savings in time. Also it is possible to add the prepolymer directly to an aqueous dispersion of fibers to form a sheet having improved homogeneity. In this instance, sheets having improved tensile strength can be obtained.

DESCRIPTION OF THE INVENTION

The present invention is a compressible, resilient, homogeneous composite sheet comprising in combination, particles of hydrophilic polyoxyalkylene polyurethane foam and fibers intertwined therewith and binding the foam particles together to form a homogeneous sheet. By homogeneity it is meant that the texture of the sheet is generally uniform in terms of strength and appearance. As an indication of compressibility and resiliency it has been found that the indentation range at 25% compression of the sheet was from about 0.5 to about 200. After one minute relaxation the range was from about 0.5 to about 250.

Where asbestos fibers are employed the indentation range for sheets of the invention is from about 25 to about 200. For cellulosic fibers the range is from about 0.5 to about 5.3. Sheets of the invention using cellulose fibers also exhibit excellent water absorption and vapor transmission. Water absorption is generally at least 350 weight percent based on the weight of sheets at normal room temperature and humidity, e.g. 40%.

In determining indentation range ASTM D-1564 was employed with a rate of compression equal to 0.1 inch/minute at a temperature of 23° C. and 50% R.H. The samples were not conditioned for any length of time prior to testing.

The compressible composite sheet of the invention is prepared by forming an aqueous dispersion of fibers and particles of hydrophilic polyurethane foam. The particles are formed by dispersing a hydrophilic oxyalkylene polyol capped with an isocyanate in water and allowing the isocyanate groups to react with the water to form a particulate dispersion of polyurethane foam particles. When adding the prepolymer it is desirable to agitate the water. The method of agitation is not critical. For example, a common laboratory mixer can be employed. It has been found that in the resulting dispersion the foam particles have a generally uniform size of less than about 0.08 inch and preferably from about 0.03 inch to about 0.01 inch. In forming the dispersion, a surfactant can be employed. However, it has been found that the foam particle size may be undesirably small, i.e. less than 0.01 inch. To avoid this situation, a different surfactant can be used, or the dispersion can be formed without using a surfactant.

It has been found that the dispersion of fibers and foam particles can be formed in several ways. First an aqueous dispersion of foam particles can be formed as described above. This aqueous dispersion can then be combined with an aqueous dispersion of the fibers using suitable agitation so that the foam particles and fibers are uniformly dispersed. Secondly (and preferably) the isocyanate-capped prepolymer can be added with agitation, directly into a dispersion of fibers. It has been found that by using direct agitation, the resulting sheet is more homogeneous. Also the separate processing step of forming an aqueous dispersion of the prepolymer is eliminated. For these reasons the direct addition procedure is preferable.

The steps of applying the aqueous fiber/foam dispersion to a supporting screen or other surface and removing water from the resulting sheet-like product can be carried out using well-known paper making techniques. For example, for small-scale applications the aqueous fiber/foam dispersion can be placed in a Williams pulp testing apparatus. The dispersion will be positioned on the screen and the water phase will drain through the screen and be removed. Subsequently the resulting sheet can be further dried as desired. For large-scale applications the fiber/foam dispersion can be placed in the headbox of a standard Fordrinier machine and dispersed onto a screen. Using this method the sheet can be rapidly formed in large quantities. The aqueous phase drains from the sheet and subsequently the sheet can be dried further.

The binding fibers employed in the present invention include materials such as asbestos, wood pulp or other similar materials dispersible in water. The length or size of the fibers is not critical. Very small fibers, e.g. less than ¼ inch would not exert adequate binding action and fibers larger than about 1 inch would tend to make dispersion in water and other processing steps difficult. However, use of surfactants or suitable agitation methods could be employed to extend the range of fibers usable in the invention. Other types of fibers useful include glass fibers, polyester fibers, olefinic fibers and polyamide fibers. It has been found that not all fibers, e.g. polyester fibers are useful in every application, i.e. the homogeneity or structural strength of the sheet may be impaired. For example polyester fibers should not be used as the sole binding fiber. It is necessary to add cellulose, asbestos or other types of fibers to increase the binding efficiency of the polyester. The binding efficiency of the fibers can also be increased by using any of the suitable, conventional, binding-type latexes, e.g. SBR, vinyl acetate or acrylic latex.

As well known in the art, another factor tending to increase fiber efficiency in binder applications is "beating" or fibrillation to unravel the ends of individual fibers or packets of fibers. This technique is especially useful with cellulosic fibers. Such fibers can be employed advantageously in the present invention.

As is well known in the art, where a cationic fiber such as asbestos is employed an anionic latex will precipitate and be effective. However, where an anionic fiber such as wood pulp is employed, it is necessary to add alum or a similar material to precipitate the latex. Where employed, the latex can be added at any convenient step, e.g. the latex can be added to an aqueous dispersion of fibers prior to adding the prepolymer or foam particles. Alternatively the latex can be added following formation of the fiber/foam dispersion.

In forming the fiber/foam dispersion the amount of prepolymer employed will be from about 10 to 60 weight percent based on the total weight of the prepolymer and fibers, but excluding water. The fibers should be from 90 to 40 weight percent using the same basis. Where a latex is employed the amount of latex should be from about 4 to 10 weight percent based on the total weight of prepolymer, fibers and latex.[1]/ Within the above ranges it has been found that increasing the amount of prepolymer increases the "softness" or cushioning effect of the resulting sheet but tends to reduce the tensile strength of the sheet. Increasing the amount of fibers employed tends to increase the strength of the sheet but reduce the cushioning effect. Within the above ranges it may also be possible to increase the strength of the sheet and still retain a high degree of softness by dispersing the prepolymer directly in the aqueous dispersion of fibers according to the second method described above. Given the relatively narrow range of ingredients described, it can be easily determined by a series of test runs whether direct addition of the prepolymer is advantageous in view of the particular fiber and other processing conditions employed.

[1]/Higher amounts of latex can be employed but this results in more "rubbery-like" properties in the finished sheet or inefficient use of the latex polymer.

In another embodiment of the invention the fiber/foam dispersion can be wet-layered onto a porous web such as cloth or a non-woven material. Using the Williams apparatus it is possible to position the fabric over the screen. Suction can be applied to facilitate drainage of the water. It has been found that the foam fiber sheet bonds to the fabric to form a laminar structure. For large-scale applications a Fordrinier machine can be modified to insert fabric over the supporting screen so that the fiber/foam dispersion emptying from the headbox is positioned directly on the fabric in sheet-like form. This procedure results in a relatively fast method of providing a soft backing to fabric. To increase binding of the fiber/foam sheet to the fabric, it is desirable to incorporate a latex into the dispersion as described previously.

In preparing dispersions useful in the present invention (foam dispersion—fiber dispersion—fiber/foam dispersion) the amount of water employed is not critical. The water level should be sufficient to permit processing of the dispersions, e.g. if the water level is too low in the foam or fiber dispersions it will be difficult to properly disperse the solid phase and the resulting dispersion will encounter separation problems as well as possess an undesirably high viscosity. Where prepolymer is being dispersed in water (with or without fibers), from 7 to 50 parts of water for every part of prepolymer should be employed. In the finished fiber/foam dispersion at least 7 parts of water should be employed for each part by weight of the combined weight of prepolymer and fiber. In forming dispersions the upper limit on the amount of water employed is not critical with the primary consideration being ease of processing, e.g. because water must be removed from the finished sheet, it is desirable to avoid using more water than necessary in dispersing the materials.

Hydrophilic Oxyalkylene Polyurethane Foam

The invention utilizes polyether polyurethanes, i.e. the branch-points of the foam are connected by essentially linear polyoxyalkylene chains. The foam is hydrophilic which means that at least 50 mole percent of the oxyalkylene units (excluding any initiators at branch-points) are oxyethylene units with the balance being oxypropylene, oxybutylene or other oxyalkylene units. Hydrophilic foams are utilized in the present invention to insure that the foam particles can be dispersed in water. To promote dispersion in polyethers where the oxyethylene content approaches 60% or so (e.g. from about 60 to 75 mole percent) it may be desirable to use a surfactant such as those specified earlier.

The hydrophilic foam can be made by any of the common processes such as the "one-shot", prepolymer or quasi-prepolymer processes. After the foam is prepared it can be shredded and used as described in U.S. Pat. No. 4,110,508.

For purposes of the present invention it is preferred to use the prepolymer technique in preparing the hydrophilic foam particles thereby avoiding separate foaming and shredding steps. Suitable prepolymers are prepared by capping a polyoxyalkylene polyol with an excess of polyisocyanate, e.g. toluene diisocyanate. Prior to capping the polyol should have a molecular weight of from about 200 to about 20,000, and preferably from about 600 to about 6,000. The hydroxy functionality of the polyol and the corresponding isocyanate functionality following capping is from 2 to about 8. If foams are formed from prepolymers with an isocyanate functionality of about 2 the resulting foam is essentially linear and does not have as much tensile strength as cross-linked foams. Accordingly, if the isocyanate functionality is about 2 a crosslinker can be employed although the linear non-crosslinked foams are operable in the present invention, i.e. the foam particles can be dispersed in water and layered out to form a sheet. Suitable crosslinkers are well known in the polyurethane art and include by way of example tolylene-2,4,6-triamine, ethylene diamine, diethanolamine, diethylenetriamine, triethylene-tetramine, tetraethylenepentamine, and ethanolamine.

Examples of suitable polyols (to be capped with polyisocyanates) include: (A) essentially linear polyols formed for example by reaction of ethylene oxide with ethylene glycol as an initiator. As discussed above mixtures of ethylene oxide with other alkylene oxides can be employed as long as the mole percent of ethylene oxide is at least 60 percent. Also as stated, it may be desirable to use crosslinkers with these systems in which case the crosslinker can be included in the water into which the prepolymer is dispersed. Where the linear polyethers are mixtures of ethylene oxide with, e.g. propylene oxide, the polymer can be either random or a block copolymer and the terminal units can be either oxyethylene or oxypropylene. A second class of polyol (B) includes those with a hydroxy functionality of 3 or more. Such polyols are commonly formed by reacting alkylene oxides with a polyfunctional initiator such as trimethylolpropane, pentaerythritol, etc. In forming the polyol B, the alkylene oxide used can be ethylene oxide or mixtures of ethylene oxide with other alkylene oxides as described above. Useful polyols can be further exemplified by (C) linear branched polyfunctional polyols as exemplified in A and B above together with an initiator or crosslinker. A specific example of C is a mixture of polyethylene glycol (m. w. about 1,000) with trimethylolpropane, trimethylolethane or glycerine. This mixture can be subsequently reacted with excess polyisocyanate to provide a prepolymer useful in the invention. Alternatively the linear or branched polyols, (e.g. polyethylene glycol) can be reacted separately with excess polyisocyanate. The initiator, e.g. trimethylolpropane, can also be separately reacted with polyisocyanate. Subsequently the two capped materials can be combined to form the prepolymer.

Suitable polyisocyanates useful in preparing prepolymers include toluene-2,4-diisocyanate, toluene-2,6-diisocyanate, commercial mixtures of toluene-2,4- and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylenediisocyanate, 1,4-tetramethylene-diisocyanate, 1,10-decamethylenediisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorenediisocyanate, 1,8-naphthalenediisocyanate, 2,6-diisocyanatobenzfuran, 2,4,6-toluenetriisocyanate, and p,p',p''-triphenylmethane triisocyanate.

Suitable initiators useful in preparing prepolymers include propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, 1,2,6-hexanetriol, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)methyl-pentanediol-1,5, 1,1,1-tris[(2-hydroxyethoxy)methyl]ethane, 1,1,1-tris[(2-hydroxypropoxy)methyl]propane, triethanolamine, triisopropanolamine, resorcinol, pyrogallol, phloroglucinol, hydroquinone, 4,6-di-tertiarybutyl catechol, catechol, and orcinol.

Use of Additional Materials

Because of the relatively large amount of water used in forming the various dispersions it is possible to combine other materials into the finished sheet. This option is generally not available with systems using a limited amount of water. Useful additives to the water include crosslinkers (especially where the prepolymer is essentially linear), flame retardants, antistats, soil repellents, fungicides, insecticides, stabilizers, fillers, biostats, color additives, organic solvents, blowing agents, dispersing agents, resins, etc. By homogeneously distributing these materials in the aqueous portion of the dispersion, it is possible to distribute the additives widely and uniformly throughout the finished sheet product.

Useful illustrative examples of materials which may be added include porous structures such as particulate wood fibers; rock wool; glass wool; bagasse; straw; cork; sponge rubber; foamed polystryene; and the like.

Fire or flame retardant additives usefully included alone or in combination in the aqueous reactant are represented by, for example, zinc borate; calcium carbonate; alum; ferrous sulfate; borax; melamine and boric acid; melamine phosphate; ammonium phosphate; stannic oxide; ammonium sulfate; ammonium sulfamate; titanium and antimon oxides in combination with halide materials and in particular the oxychlorides; aluminum hydrate; ceric hydrate; tetrakis (hydroxymethyl) phosphonium chloride; bromoform and triallyl phosphate; phosphoroxytriamide; chlorinated paraffins; tris (2-ethyl hexyl) phosphate; tris (2,3-dibromopropyl) phosphate, triphenyl phosphate, cresyl diphenyl phosphate; and the like.

The sheet-like materials of the invention retain dimensional stability during wetting and drying cycles and for functional, reinforcing, strengthening, binding, opacifying or cushioning effects; they are useful for various end products such as drapery backing, upholstery backing, blankets, absorptive padding, wall coverings, acoustical panels, protective and/or fire retardant surfaces, apparel, shoe linings, separation membranes, filters and the like. The feature of water vapor permeability of sponges resulting from the hydrophilic nature of the polyoxyethylene polyol reactant renders them attractive for apparel. These present materials are also useful as leather substitutes.

The following examples are presented to illustrate the invention. Examples 1–11 deal with preparation of hydrophilic foams, shredding the foams, dispersing the foam particles in water, and wet-layering the particles to form a sheet. Examples 14–28 deal with formation of foam particles by dispersing a prepolymer into water or an aqueous fiber dispersion followed by wet-layering to form a sheet. Examples 12 and 13 describe prepolymers useful in forming sheets either by the shredding process or by dispersion of the prepolymer into water to provide the foam particles.

EXAMPLE 1

To a reaction vessel containing 3,092 grams, representing 1 mole, 3 eq. OH, of a triol prepared from potassium hydroxide catalyzed reaction of 92 grams anhydrous glycerol with 3300 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70° C. by external cooling with water, while stirring for 4 hours. The actual isocyanate content, determined by titration with standard n-butylamine solution in toluene, remained at the constant level of 0.79 meq. NCO/gram relative to a theoretical content of 0.83 meq. NCO/gram. The resultant pale yellow syrup was found to solidify at about 30°–35° C., was soluble in toluene, and acetone, readily reacts with water, and had the following average formula:

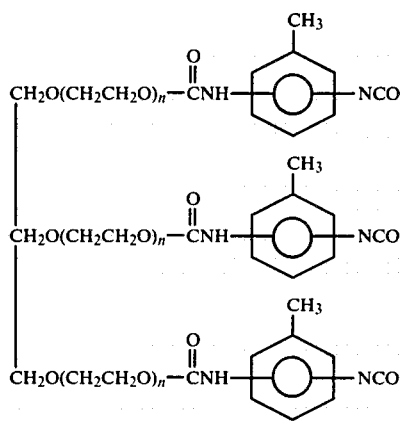

where n has an average value of about 22. The theoretical molecular weight of the resin product is about 3615.

200 grams of the capped resin having an eq. NCO content of 0.016 was stirred briefly and reacted with 200 grams water. The moles H₂O/NCO groups was 73.2. The reaction mixture was immediately foamed, shredded mechanically to an average particle size to pass through a wire screen of 0.030 inch mesh and wet layered using the paper pulp technique to prepare a bound foam fabric having a thickness when dry of about 0.125 inches. The hydrophilic product was found to have good breathability and comfort characteristics and excellent moisture equilibrium maintenance.

EXAMPLE 2

To a reaction vessel containing 4,136 grams, representing 1 mole, 4 eq. OH, of a tetrol prepared from sodium methoxide catalyzed reaction of 136 grams pentaerythritol with 4400 grams of ethylene oxide, were added 696 grams of tolylene diisocyanate having about 80/20 mixture of 2,4 isomer/2,6 isomer. The reaction was carried out using the procedure of Example 1. The actual isocyanate content noted was 0.86 meq. NCO/gram relative to a theoretical content of 0.83 meq. NCO/gram. The recovered product was a colorless syrup which solidified at about 35°–40° C., was soluble in toluene and acetone, readily reacts with water, and had the idealized average formula:

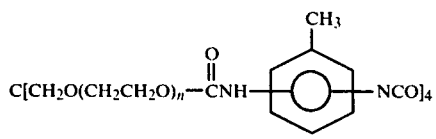

where n has an average value of about 22. The theoretical molecular weight of the resin product is about 4832.

50 grams, of the recovered capped resin product from this example, were reacted with 55 grams water. The moles H₂O/NCO groups was about 73.2. The foam product was shredded, combined with 7.5 grams cellulosic pulp and 20 grams of acrylic latex. These ingredients were wet layered. Corresponding results to that of Example 1 were realized. It was further noted that the hydrophilic polyurethane interpenetrated the fibers of the fabric and served as a reinforcing binder. The fabric remained soft and pliable.

EXAMPLE 3

A solution of 92 grams glycerol and 1000 grams of polyoxyethylene (1000) glycol was outgassed at 100° C. and 10 Torr for two hours. To the outgassed solution was added 870 grams tolylene diisocyanate having an 80/20 mixture of 2,4 isomer/2,6 isomer. The reaction solution was stirred at 60° C. for four hours whereupon the actual isocyanate content reached a constant 2.49 meq. NCO/gram relative to a theoretical content of 2.54. 31.3 parts of the resin product had a theoretical molecular weight of 615.

20 grams of water containing 0.5 grams of antimony trioxide and 5 grams of polyvinyl chloride-latex particles was mixed with 10 grams of the capped resin product having an eq. NCO content of 0.016. The moles H₂O/NCO groups was 125. The foam so generated was shredded and layered onto a fabric by the procedure of Example 1. The composite product was found to have excellent comfort, fire retardancy and moisture equilibrium maintenance.

EXAMPLE 4

The procedure of Example 1 was repeated except that 20 grams of the shredded product was combined with 20 grams of water and 1.5% by weight soft wood paper pulp. The product was characterized with a soft open cell structure which was flexible yet fairly tough and was found to have excellent properties. The weight of pulp employed is based on the weight of the foam particles.

EXAMPLE 5

In order to demonstrate use of polyoxyethylene polyisocyanate in making products with attractive colors, a 10 gram portion of the polyoxyethylene tetraisocyanate prepared in Example 2 was mixed with 10 grams of water containing 0.5 gram of Hansa yellow color. A composite having a yellow color and the excellent characteristics of the product of Example 2 resulted.

EXAMPLE 6

In order to demonstrate capping of a polyoxyethylene diol with a polyisocyanate having a functionality greater than 2, to give polyisocyanate foams with higher crosslink density and superior physical properties, lower solubility, and greater hydrolytic stability than products from polyoxyethylene diisocyanates, a 1000 gram portion, of polyoxyethylene glycol of 4000 weight average molecular weight was outgassed at 110° C. and 10 Torr for two hours. Next, to this outgassed liquid was added at 60° C. 200 grams, of polymethylene polyphenylisocyanate commercially available under the name PAPI 901 by Upjohn Co. This latter material has nearly three isocyanate groups per molecule and an isocyanate equivalent weight of 133. A dark reaction solution was noted which was stirred at 60° C. to 70° C. for five hours whereupon the NCO content reached a constant 0.825 meq. NCO/gram relative to a theoretical value of 0.833. The resultant dark product syrup solidified at 45° C. to form a brown, waxy product. Addition of 10 grams of water to 10 grams of the prepared liquid polyisocyanate at 60° C. resulted in a foam and using the procedure of Example 1 gave a resultant tan, soft, flexible, hydrophilic fabric product.

EXAMPLE 7

In order to illustrate use of copolymers of 75% ethylene oxide and 25% propylene oxide along with methylene dicyclohexyl diisocyanate to form a triisocyanate that readily reacts with water to give a hydrophilic product, a mixture of 13.4 grams, 0.1 mole of trimethylolpropane and 0.6 grams, 0.01 mole of potassium hydroxide was stirred at 100°-180° C. in the presence of 250 grams of ethylene oxide at 20 to 100 psi. After 3 hours the reaction pressure dropped to one atmosphere. To the reaction product syrup was then added 250 grams of propylene oxide with stirring at 100°-180° C., and a pressure of 20 to 75 psi for 4 hours whereupon the reaction pressure at 100° C. dropped to one atmosphere. To this reaction product syrup having a brown color was added 500 grams of ethylene oxide. The reaction was stirred at 100°-180° C. for 12 hours whereupon the reaction pressure dropped to one atmosphere at 100° C. The resultant brown oil was stripped of volatiles at 50° to 100° C. at 10 Torr resulting with 978 grams of brown syrup having a hydroxyl content of 0.32 meq. OH/gram relative to 0.31 meq/gram theory.

To 931 grams, 0.30 eq. OH of the prepared triol was added 88.0 grams, 0.32 moles, of dicyclohexylmethane diisocyanate. The solution stirred at 60° C. for 8 hours whereupon the NCO content of the polymer reached a constant 0.33 meq./gram relative to 0.32 theory. The triisocyanate product was characterized as a light amber syrup having a viscosity of 12,000 cps at 25° C. (Brookfield).

To a 10 gram portion of the above triisocyanate containing 0.1 gram of silicone surfactant L520 by Union Carbide was added with good mixing 12 grams of water. A product having similar properties to those of the product of Example 1 resulted.

EXAMPLE 8

The following substrates were coated on one side by wet layering using the product of Example 3.

| Substrate | Size (Cm.) | Average Thickness Foam Pad (mm) |
| --- | --- | --- |
| Regular kraft paper | 10 × 40 | 4.5 |
| Upholstery fabric, | 10 × 40 | 4.1 |

-continued

| Substrate | Size (Cm.) | Average Thickness Foam Pad (mm) |
| --- | --- | --- |
| Nylon Muslin sheet | 10 × 40 | 5.5 |
| Unbacked, needled carpet, polypropylene fiber, (0.05 g/cm² density) | 20 × 40 | 4.5 |
| Rayon nonwoven web | 10 × 40 | 3.8 |
| Polyethylene nonwoven web | 10 × 40 | 3.5 |

EXAMPLE 9

Sheets were prepared by mixing the shredded foam of Example 1 and additional ingredients as stated in the table below into about 4 liters of water with processing through a "Williams Standard Pulp Testing Apparatus".

| Conc. Shredded HYPOL (g) | Pulp Conc. (g) | CSF[1] | Asbestos Conc. (g) | Latex (Solids) Conc. (g) | Alum Conc. (g) | Substrate[2] |
| --- | --- | --- | --- | --- | --- | --- |
| 25 | 25 | 600 | — | — | — | Cheese Cloth |
| 25 | 5 | 600 | — | 8 | — | Nonwoven Polyester Web |
| 60 | 5 | 600 | — | — | — | — |
| 60 | 10 | 520 | — | — | — | Upholstry Fabric |
| 25 | — | — | 25 | 7 | 0.6 | — |
| 50 | 10 | 420 | — | — | — | — |

[1]Canadian Standard Freeness
[2]The wire screen of the Pulp Testing Apparatus was covered by the substrate and the foam sheet formed on the substrate during processing.
Corresponding results may be realized.

EXAMPLE 10

The procedure of Example 8 was repeated using a 20×24 cm. polyamide unbacked carpet except that 30 grams of shredded foam was wet layered.

EXAMPLE 11

The procedure of Example 9 was repeated except that a 10×40 inch section of muslin sheet was laminated by wet layering with 15 grams of shredded foam.

A 6 mm thick pad of flexible foam laminate resulted; the muslin fabric being integrally bonded. This product was very absorbent of water and was useful as a wiping cloth; similar in effectiveness to chamois. It is also useful as a fabric interliner for wearing apparel, shoe and boot linings and insoles, various types of gas and liquid filters, light weight blankets, mattress covers, coasters, tablecloths, diapers, incontinent pads, upholstery fabrics, mattress ticking, drapery fabrics, sound absorbing wall coverings, vehicle headlining materials, carpet and rug under padding, bathroom and bedroom slippers and the like.

EXAMPLE 12

A prepolymer is prepared by admixing trimethylolpropane (TMOP) with polyethylene glycol (PEG - 1,000). The mole ratio of PEG/TMOP was 2:1. The polyol mixture was admixed with sufficient toluene diisocyanate (TDI) to react with about 95% of the hydroxyl groups in the polyol. The reaction was carried out at 60° C. Following the capping reaction a second addition of TDI was made sufficient to react with about 15% of the hydroxyl groups originally present in the polyol, thereby providing a 10% excess of TDI. Following the second addition the reaction mixture was maintained at a temperature of about 60° C. for a two-hour period. The resulting prepolymer is referred to below as Prepolymer 1.

foam particles. Dispersion is accomplished by slowly pouring the prepolymer into 7 to 50 times its weight of water while stirring with a standard laboratory mixer. The water may contain additional ingredients such as asbestos, wood pulp, or polyester fibers. Examples 19-23 additionally employ latex (GRS - 2,000) and alum. The types of ingredients employed, amounts, and results obtained are set forth in the following tables.

TABLE A

| Example | Asbestos[1] % | Prepolymer[1] % | Prepolymer Type | Addition Technique | Sheet App. | Tensile Strength[2] |
|---|---|---|---|---|---|---|
| 14 | 51.5 | 48.5 | 1 | A | Slight Layering | 25 |
| 15 | 51.5 | 48.5 | 1 | B | Almost Homogen. | 21 |
| 16 | 51.5 | 48.5 | 1 | B | Homogen. | 39 |
| 17 | 51.5 | 48.5 | 2 | B | Homogen. | 10 |
| 18 | 34.7 | 65.3 | 2 | B | Homogen. | very weak |

A Asbestos and Prepolymer dispersions prepared separately and then mixed.
B Prepolymer dispersed directly into dispersion of asbestos fibers.
[1] The percentages for asbestos fibers and prepolymer are based on the combined weight of fibers plus prepolymer.
[2] Tensile strength was determined according to ASTM D-638.

TABLE B

| Example[5] | %[1] Wood Pulp | %[1] Prepolymer | Addition Technique | Addition[4] | Stiffness | Homogeneity | Cushioning | Tensile Strength[2] (psi) |
|---|---|---|---|---|---|---|---|---|
| 19 | 64 | 36 | A | C | 1 | 4 | 3 | 346 |
| 20 | 64 | 36 | B | C | 3 | 1 | 2 | 217 |
| 21 | 64 | 36 | A | D | 4 | 3 | 1 | 34 |
| 22 | 71 | 29 | A | C | 2 | 2 | 4 | 345 |
| 23 | 59 | 41 | B | C | 1 | 1 | 5 | 548 |

A Pulp and prepolymer dispersions prepared separately and then mixed.
B Prepolymer dispersed directly into pulp slurry.
C Latex (GRS - 2000) alum added to pulp slurry.
D Latex (GRS - 2000) alum added to the combined pulp prepolymer slurry.
[1] The percentages for wood pulp and prepolymer are based on the combined weight of these materials.
[2] Tensile strength was determined according to ASTM D-638.
[3] Values for stiffness, homogeneity and cushioning were assigned based on manual inspection starting with a rating of 1 for the highest degree of stiffness, homogeneity or cushioning.
[4] About 7.5 weight % of latex solids was employed in each run based on the combined weight of pulp, prepolymer and latex.
[5] All Examples used Prepolymer 2.

TABLE C

| Example[4] | %[1] Wood Pulp Fibers | %[1] Polyester | %[1] Prepolymer | Relative Total Charge | Williams Freeness | Prepolymer Type | Stiffness | Homogeneity | Cushioning | Tensile[2] Strength (psi) |
|---|---|---|---|---|---|---|---|---|---|---|
| 20 | 64 | 0 | 36 | 1 | 8 | 2 | 2 | 2 | 4 | 217 |
| 23 | 59 | 0 | 41 | 0.87 | 8 | 2 | 1 | 1 | 5 | 548 |
| 24[6] | 51 | 13 | 36 | 1 | 8 | 2 | 3 | 4 | 2 | 177 |
| 25 | 38 | 26 | 36 | 0.5 | 7 | 2 | 4 | 5 | 3 | 184 [5] |
| 26 | 43 | 29 | 29 | 0.45 | 7 | 2 | — | — | — | [5] |
| 27 | 38 | 26 | 36 | 0.5 | 5 | 2 | 5 | 3 | 1 | 140 [5] |
| 28 | 38 | 26 | 36 | 0.5 | 5 | 1 | — | — | — | [5] |

[1] The % is based on the combined weight of pulp, polyester fibers and prepolymer employed.
[2] Tensile strength was determined according to ASTM D-638.
[3] Values for stiffness, homogeneity and cushioning were assigned based on manual inspection starting with a rating of 1 for the highest degree of stiffness, homogeneity or cushioning.
[4] Examples 20 and 23 are repeated from the preceding table.
[5] As illustrated by Examples 26 and 28 it may be necessary to adjust the fiber mix employed to include less polyester fibers if a coherent sheet is to be obtained.
[6] In Examples 24-28 the prepolymer is dispersed directly into a dispersion of the fibers.

EXAMPLE 13

A prepolymer was prepared following the general procedure of Example 12. The PEG/TMOP ratio was 3.33:1 and in the first incremental addition of TDI approximately 93% of theory was employed. In the second addition 12% of theory was employed. The resulting prepolymer is referred to below as Prepolymer 2.

EXAMPLES 14-28

The following tables (A-C) illustrate the preparation of sheets by dispersion of prepolymer into water to form

What is claimed is:
1. A method for preparing a compressible, resilient, homogenous composite sheet having sufficiently low modulus of compression to provide a cushioning effect, said method comprising
(A) forming an aqueous dispersion of fibers,
(B) forming an aqueous dispersion of particles of hydrophilic polyurethane foam prepared by dispersing a prepolymer of a hydrophilic oxyalkylene polyol capped with an isocyanate in water and allowing the isocyanate groups to react essentially simultaneously with the water to form polyurethane particles in-situ, wherein said prepolymer is from about 10 to about 60% by weight, based on total weight of prepolymer and fibers, wherein said polyol has a molecular weight from about 200 to about 20,000 and contains at least 50 mole percent oxyethylene units, wherein the size of the polyurethane particles are not less than about 0.01 inch mesh, and wherein from about 7 to about 50 parts of water is used for every part of prepolymer, (C) mixing dispersion (A) and (B), (D) wet-layering the mixed dispersion onto a support, and (E) removing water from the resulting supported fiber/foam sheet.

2. A method as in claim 1 wherein the fibers are asbestos.

3. A method as in claim 1 wherein cellulosic fibers are employed.

4. A method as in claim 1 wherein latex is added to the mixed dispersions before wet layering.

5. A method as in claim 1 wherein the hydrophilic oxyalkylene polyol contain at least 60 mole percent of oxyethylene units in the backbone.

6. A method as in claim 1 wherein from about 7 to about 50 parts of water is used for every part of isocyanate capped prepolymer.

7. A method for preparing a compressible resilient, homogeneous compsite sheet having sufficiently low modulus of compression to provide a cushioning effect, said method comprising:

(A) forming an aqueous dispersion of fibers and particles of hydrophilic polyurethane foam by dispersing into an aqueous fiber dispersion a hydrophilic oxyalkylene polyol capped with an isocyanate whereby said capped polyol reacts essentially simultaneously with the water in said fiber dispersion to form particulate polyurethane foam particles in-situ to produce a fiber/foam dispersion, wherein said capped polyol is from about 10 to about 60% by weight based on total weight of capped polyol and fiber, wherein said polyol has a molecular weight from about 200 to about 20,000, wherein said polyol contains at least about 50 mole percent oxyethylene units, wherein the foam particles size is not less than about 0.01 inch mesh, and wherein from about 7 to about 50 parts of water for every part of capped polyol is employed.

(B) wet-layering said fiber/foam dispersion onto a support, and (C) removing water from the resulting supported fiber/foam sheet.

8. A method as in claim 7 wherein the fibers are asbestos.

9. A method as in claim 7 wherein cellulosic fibers are employed.

10. A method as in claim 7 wherein latex is added to the dispersion before wet layering.

11. A method as in claim 7 wherein the hydrophilic oxyalkylene polyol contains at least 60 mole percent of oxyalkylene units in the backbone.

12. A method as in claim 7 wherein at least 7 parts of water is used for each part by weight of the combined weight of capped polyol and fiber.

13. In the method for preparing a compressible resilient, homogenous composite sheet by forming an aqueous dispersion containing particulate foam and fibers, wet-layering the fiber/foam dispersion onto a support to form a sheet, and removing water from the resulting supported sheet, the improvement comprising using, in place of shredded foam particles, a particulate dispersion of polyurethane foam prepared by dispersing an isocyanate-capped hydrophilic polyoxyalkylene polyol in water and allowing the isocyanate groups to react essentially simultaneously in-situ with the water to provide the foam particles, wherein said capped polyol is from about 10 to about 60% by weight based on total weight of capped polyol and fibers, wherein said hydrophilic polyoxyalkylene polyol has a molecular weight from about 200 to about 20,00 and contains at least 50 mole percent oxyethylene units, wherein the size of said foam particles is not less than about 0.01 inch mesh, and wherein from about 7 to about 50 parts of water is used for every part of capped polyol.

14. A method as in claim 13 wherein a separate fiber dispersion and a separate particulate foam dispersion are formed and subsequently combined to form the fiber/foam dispersion.

15. A method as in claim 14 wherein the fibers are asbestos.

16. The method as in claim 14 wherein cellulosic fibers are employed.

17. A method as in claim 16 wherein latex is added to the dispersion of cellulosic fibers.

18. A method as in claim 14 wherein the hydrophilic oxyalkylene polyol contains at least 60 mole percent of oxyethylene units in the backbone.

19. A method as in claim 13 wherein the hydrophilic isocyanate-capped prepolymer is dispersed in an aqueous dispersion of fibers to form the fiber/foam dispersion.

20. A method as in claim 19 wherein the fibers are asbestos.

21. A method as in claim 19 wherein cellulosic fibers are employed.

22. A method as in claim 19 wherein latex is added to the fiber/foam dispersion before wet-layering.

23. A method as in claim 19 wherein the hydrophilic oxyalkylene polyol contains at least 60 mole percent of oxyethylene units in the backbone.

24. A compressible, resilient, homogenous composite sheet comprising in combination, particles of hydrophilic polyoxyalkylene polyurethane foam and fibers interwined therewith and binding the particles together to form said sheet, the improvement wherein said foam particles are formed by in-situ foaming by dispersing an isocyanate capped hydrophilic oxyalkylene polyol in an aqueous dispersion of fibers, according to the method of claim 12.

25. A sheet as in claim 24 wherein the fibers are asbestos.

26. A sheet as in claim 24 wherein cellulosic fibers are employed.

27. A sheet as in claim 24 wherein latex is employed in combination with the fibers.

28. A sheet as in claim 24 wherein the oxyalkylene polyurethane contains at least 50 mole percent of oxyethylene units in the backbone.

29. A composite laminate comprising in combination, particles of hydrophilic polyoxyalkylene polyurethane foam and fibers intertwined therewith and binding the particles together to form a sheet, and a porous web supporting and adhering to said sheet, the improvement wherein said foam particles are formed by in-situ foaming by dispersing an isocyanate capped hydrophilic oxyalkylene polyol in an aqueous dispersion of fibers according to the method of claim 12.

30. A laminate as in claim 29 wherein the web is a woven fabric.

31. A laminate as in claim 29 wherein the web is a non-woven material.

32. A laminate as in claim 29 wherein the fibers are asbestos.

33. A laminate as in claim 29 wherein the fibers are cellulose.

34. A laminate as in claim 29 wherein latex is employed in combination with the fibers.

35. A laminate as in claim 29 wherein the polyurethane foam particles contain at least 60 mole percent oxyethylene units in the polyoxyalkylene backbone.

* * * * *